United States Patent [19]

Epperson

[11] Patent Number: 4,696,860
[45] Date of Patent: Sep. 29, 1987

[54] PARTICULATE SPACERS FOR INHIBITING NEWTON RINGS IN TOUCH SENSITIVE OVERLAYS

[75] Inventor: David L. Epperson, Granite Falls, Wash.

[73] Assignee: John Fluke Mfg. Co., Inc., Everett, Wash.

[21] Appl. No.: 780,583

[22] Filed: Sep. 26, 1985

[51] Int. Cl.$^4$ .................. B32B 19/04; B32B 5/16
[52] U.S. Cl. ........................... 428/325; 427/214; 427/427; 428/327; 428/328; 428/430; 428/441
[58] Field of Search ............... 428/13, 328, 325, 327, 428/430, 441; 200/159 B; 427/427, 214

[56] References Cited

U.S. PATENT DOCUMENTS

| | | | |
|---|---|---|---|
| 4,169,323 | 10/1979 | Engel | 428/13 X |
| 4,371,345 | 2/1983 | Palmer et al. | 428/13 X |
| 4,373,282 | 2/1983 | Wragg | 428/13 X |
| 4,423,299 | 12/1983 | Gurol et al. | 200/159 B |

*Primary Examiner*—Thomas J. Herbert
*Attorney, Agent, or Firm*—Mikio Ishimaru; Chittaranjan Nirmel

[57] ABSTRACT

Fine particles, preferably of brown alumina (approximately 96% $Al_2O_3$), are disposed between closely spaced and normally parallel surfaces of two adjacent transparent layers, such as are typically found in a touch sensitive overlay (TSO). The particles are preferably of a size within the range 3–100 microns, and are distributed in a density preferably in the range 300–3,000 particles per square inch, so that the larger particles are in simultaneous contact with both the parallel surfaces. Local pressure on a TSO panel with this distribution of particles of non-uniform size allows operation of the panel without the generation of distracting Newton rings between the surfaces contacting the particles. These particles may be conveniently sprayed onto either of the parallel surfaces in suspension with a fluid carrier that evaporates to leave the particles adhering to the sprayed surface.

19 Claims, 6 Drawing Figures

PARTICULATE SPACERS FOR INHIBITING NEWTON RINGS IN TOUCH SENSITIVE OVERLAYS

TECHNICAL FIELD

This invention relates generally to the disposition of a fine particulate material between adjacent transparent layers in a touch sensitive overlay to inhibit the formation of Newton rings between such layers.

BACKGROUND OF THE INVENTION

Touch sensitive overlays (TSO) are encountered frequently in use with keyboards or touch responsive computer monitor screens. They typically involve at least two layers of suitable flexible plastic material maintained very closely spaced and parallel to each other, with each one of the adjacent surfaces being coated in a suitable pattern with electrically conducting material such as, for example, vacuum deposited gold. When external pressure, as by the finger of an operator, is applied to one of the sheets the gap between the two is closed and electrical contact is made between the patterned electrically conducting materials thus providing a useful signal which can be decoded. There is, generally, a clear firm surface provided behind the flexible electrically conducting coated layers to provide support when these are pressed together. A convenient material for this use is acrylic plastic. The different layers are all closely spaced apart and held firmly on the outer peripheries. The electrically conductive portions are electrically connected to a suitable circuit to form an operating TSO.

In many uses, e.g., when light from a computer monitor is observed through a conventional TSO, it is noticed that Newton rings are formed around the point at which the person presses the TSO to obtain the signals. Depending on the transparent materials, the layer thicknesses, and the spacing between adjacent surfaces, Newton rings may be seen even without the application of a local force. Newton rings are multicolored striations that are visible, e.g., around the point at which the TSO is pressed, and are caused by interference between light waves passing through the very narrow thin regions around a point of close proximity between transparent materials. When Newton rings are formed in a location so as to intrude on or intercept a visual or optically perceptible signal coming through the TSO they distract the operator and are deleterious to the operation of the TSO for prolonged periods. It is therefore desirable that a simple, convenient, and inexpensive solution be found to reduce or eliminate the formation of Newton rings within TSO assemblies.

It is old in the art to deliberately apply non-conducting material in a selected pattern, or to have small raised points or bumps in one or both surfaces that have electrically conducting layers applied to them as part of the TSO assembly. Such layers of panel 11, and the various electrical connections 12, 13 to different electrically conducting layers, are conventionally held together by metal clips 60 applied at the peripheral edges of the panel (see FIG. 1). What is contemplated here, however, is the avoidance of the formation of Newton rings behind the rearmost surface of such a layer, between it and a transparent backing plate forming part of the TSO assembly. The present invention teaches a solution that involves a deposition of fine particulate material, with the particles being sized within a predetermined range, to thereby significantly reduce or avoid the formation of undesirable Newton rings as described above.

DISCLOSURE OF THE INVENTION

Accordingly, it is an object of this invention to provide a means for preventing the formation of Newton rings between closely spaced parallel transparent surfaces.

It is also an object of this invention to provide for touch sensitive overlay (TSO) panels in which the formation of Newton rings is significantly reduced about the point of contact made by an operator using the TSO.

It is a further object of this invention to provide an inexpensive and readily applied material for preventing the formation of Newton rings between a support surface and the rear layer of a two layer touch sensitive panel.

It is yet another object of this invention to provide a method for readily and inexpensively treating a transparent support surface at the rear of a TSO panel to prevent the formation of Newton rings thereat during use of the panel.

These and other related objects of this invention are achieved by depositing fine particles, randomly sized within a predetermined size range, preferably 3–100 microns, in the narrow space between transparent layers where Newton rings are likely to form, in such a manner that the largest of these deposited particles are randomly distributed in a predetermined density, preferably in the range 300–3,000 particles per square inch, and are in simultaneous contact with the two adjacent surfaces.

A method for eliminating the formation of Newton rings between adjacent closely spaced surfaces of two parallel layers in a TSO assembly comprises the deposition of fine particles of a selected material, in suspension with a fluid carrier, onto one of these adjacent surfaces so as to obtain a random distribution of the particles within the range 1,000–3,000 particles per square inch such that when the two transparent layers are assembled in the TSO panel the largest particles simultaneously contact both of the adjacent surfaces. Small glass beads, suspended in a chloride solution of an alkali earth metal, likewise, provide satisfactory separation. The carrier fluid evaporates in each case and leaves behind a suitable random distribution of the optically non-intrusive fine particles which adhere to the surface onto which they were sprayed, for location thereafter between the adjacent electrically conductive layers. While the true cause responsible for the desired adherence of the fine particles to the surface they are sprayed on is not fully understood, it is believed that this adherence is due to small or molecular bonding forces otherwise known as van der Waals' forces. Thus the particles do not depend on pressure by one of the spaced-apart surfaces acting against the other surface to maintain the particulate distribution in place. It is believed that the fluid carrier also serves to avoid or prevent the exertion of van der Waals' forces between particles, thus providing the desired random distribution of particles adhering to the sprayed-on surface.

BRIEF DESCRIPTION OF THE DRAWINGS

The same numbers are used to identify like elements or parts of elements, in each of the drawings and for purposes of reference elsewhere.

BEST MODE FOR PRACTICING THE INVENTION

Figure 1:
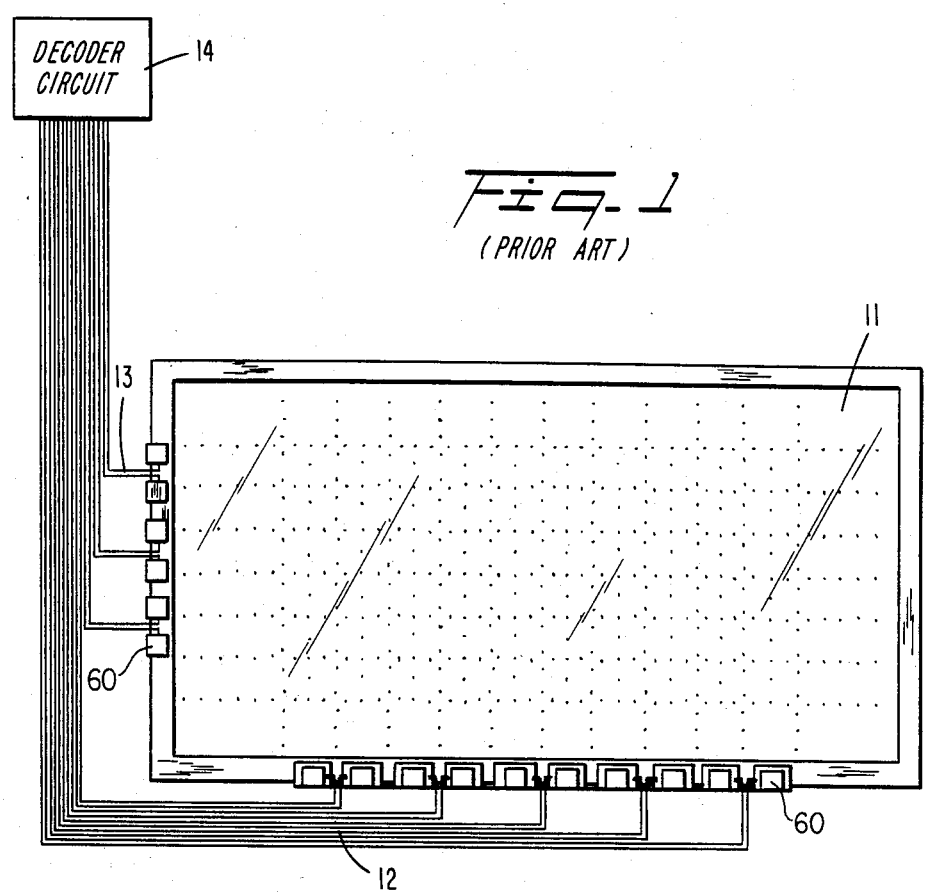
FIG. 1 is a plan view of a typical prior art touch sensitive overlay panel, including wiring to top and bottom electrically conductive transparent layers.
Figure 2:
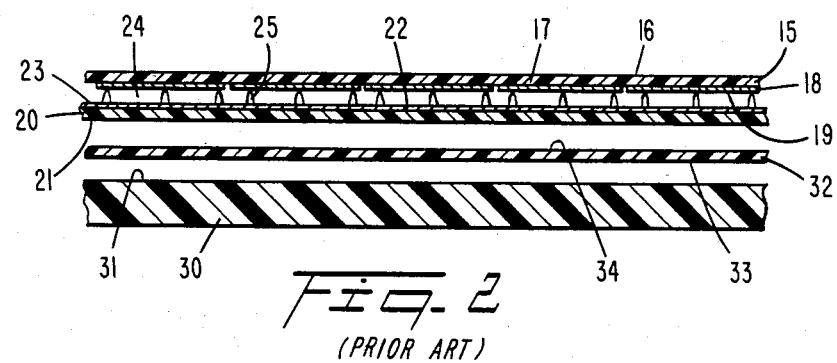
FIG. 2 is a sectional view, normal to the view of FIG. 1, showing the composite layers, spaces, and typical transparent backing plate that constitute a typical TSO.

FIG. 1 shows a typical conventional flat TSO panel 11, to which are attached wires 12, and 13 leading to a decoder circuit 14. Wires 12 are in contact with electrically conductive vertical deposits 18, as best seen in FIG. 2, on the underside of the topmost transparent layer 15. Wires 13, likewise, are attached to respective horizontal layers of electrically conductive material 23 deposited on the top surface of a transparent layer 20 beneath transparent layer 15, as best seen in FIG. 2. Decoder circuit 14 is electrically connected or associated with a computer which is not shown for simplicity.

Persons skilled in the art will recognize that other geometries involving closely spaced apart surfaces, e.g., with cylindrical or spherical shapes, are feasible and at times even desirable. The geometry of the surfaces generally, or the particular use thereof, e.g., in an analog panel, in no way detracts from the usefulness of this invention in significantly reducing Newton ring formation therein.

FIG. 2 shows a top surface 16 of top transparent layer 15. The operator, in using the TSO, would press the top surface 16 at a selected point. Application of pressure by an operator, downward onto surface 16 in FIG. 2, will cause surface 19 of electrically conductive layer 18 to be in contact locally with surface 24 which is the top surface of the lower electrically conductive layer 23. It is conventional to have small uniformly distributed bumps 25 of non-conductive material distributed across the active surface of the TSO to keep the upper and lower conductive surfaces apart except when pressed locally by the operator. A typical pattern of such bumps is seen in FIG. 1 which is a plan view of the TSO panel.

Layer 30, in FIG. 2, often is a clear acrylic plastic backing plate of the TSO panel, with a top surface 31. Other transparent materials, e.g., glass or polycarbonates, may also be used for such a backing plate. Layer 32, between the backing plate 30 and the lower clear layer 20, is typically a Newton ring preventing material that is deposited across one or the other of surfaces 31 or 21. The purpose of layer 32 is to prevent the formation of Newton rings between clear layer 20 and backing plate 30. Such a layer 32 adhering to the lower clear surface 20 and the top of clear backing plate 30 tends to cut down on the amount of light that can be transmitted through a TSO panel, and adds to the complexity and cost of assembling the TSO panel.

Figure 3:
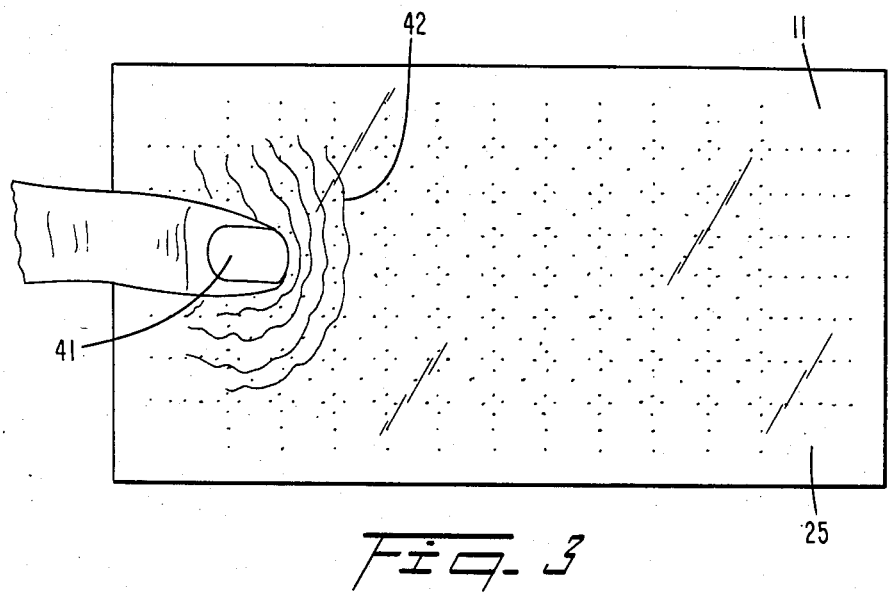
FIG. 3 is an illustration schematically depicting how Newton rings are formed when an operator presses with a finger on the front of a TSO panel.

FIG. 3 shows in plan view how Newton rings would appear where an operator presses on the top of the TSO panel with his or her finger 41. Newton rings 42 have a tendency to take on striations of multiple colors, much like a rainbow, due to interference between the light transmitted through the neighboring layers beneath.

It is found that a distribution of fine particles, of a selected material and within a predetermined size range, preferably 3–100 microns between the under surface 21 of lower clear layer 20 and the top surface 31 of clear backing plate 30 prevents the formation of Newton rings when the TSO panel is used as schematically indicated in FIG. 3. A particularly suitable material for such particles is brown alumina (approximately 96% $Al_2O_3$). It is also found that a suitable distribution density for the particles in this size range is 300–3,000 particles per square inch of treated surface.

Figure 4:
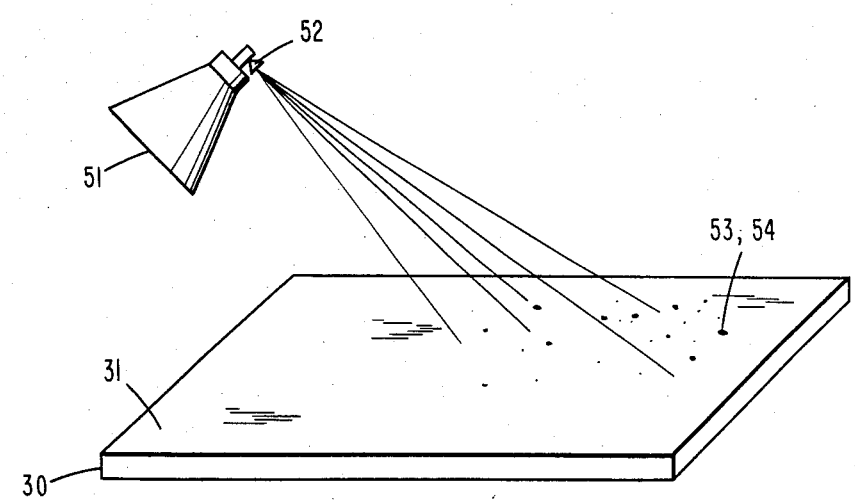
FIG. 4 is an illustration of how a spray of fine particles suspended in a fluid carrier is applied to one of the two surfaces that cause Newton rings when pressed together.

FIG. 4 shows one convenient technique for obtaining the desired distribution of particles, here shown as being on the top surface 31 of clear backing plate 30. Any conventional spraying apparatus 51 with an adjustable nozzle 52, providing a spray 34 comprised of particles 53 and a fluid carrier 54 is applied to surface 31 to obtain the desired density. It is important that the particles be wet, e.g., by suspension in a liquid carrier, when applied to the surface to which their adhesion is desired. It is also important that the distribution of particles be uniform in the sense that the random distribution of differently sized particles within the selected size range should not vary significantly over surface 31. An equally effective alternative would be to so spray surface 21 of clear layer 20. It is found that Freon (TM) TMS or DI (deionized) water are suitable carrier fluids within which particles of brown alumina may be suspended for such spraying. It is found that brown alumina has an inherent tendency to adhere to materials found to be generally suitable for such applications, e.g., glass, polycarbonates, acrylic plastics, and Mylar films, whether or not said surfaces have an electrically conducting metal or oxide deposit thereon. Brown alumina, of course, is electrically non-conductive. It is also found that brown alumina so deposited virtually disappears from sight in the assembled TSO panel, unlike the film that causes fuzzy images in conventional prior art panels.

When other particulate materials, e.g., glass beads, are used in this manner, it may be advantageous to employ an aqueous solution of a chloride salt of an alkaline earth metal, e.g., NaCl, KCl, or the like.

Figure 5:
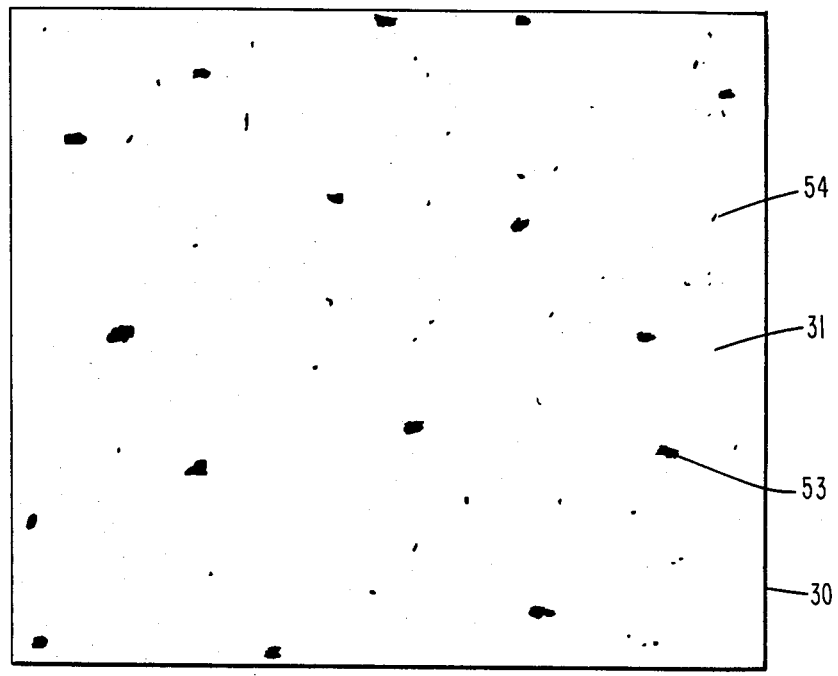
FIG. 5 is an enlarged plan view illustration of how the deposited particles are randomly distributed on a treated surface according to this invention.

After the carrier fluid has evaporated, and the particles are left in selected distribution on the treated surface, the next or adjacent layer is placed on top of that. This ensures that the larger particles are in simultaneous contact with both the adjacent surfaces forming the closed space within which the particles are contained. Obviously there are many smaller particles also present on the treated surface dispersed among the larger particles which are not in simultaneous contact with the two adjacent transparent layers. FIG. 5 is an enlarged schematic representation of a portion of surface 31 of backing plate 30 showing thereon the largest particles 53 in random distribution among smaller particles.

Figure 6:
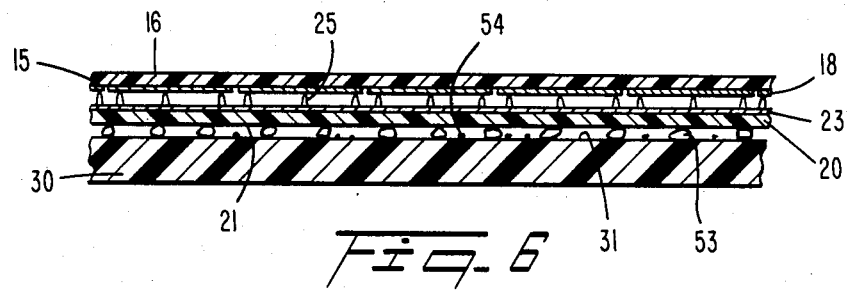
FIG. 6 is a sectional view normal to a TSO assembly prepared according to this invention.

FIG. 6 shows a section normal to that of FIG. 5 depicting, in particular, how the larger particles 53 are in simultaneous contact with surface 21 of transparent layer 20 and surface 31 of transparent backing plate 30. It is believed that it is the non-uniformity in size of the particles deposited at the treated surfaces which produces the desired effect of significantly reducing or eliminating Newton rings when pressure is applied to the TSO by an operator.

It is to be expected that persons reasonably skilled in the art will consider other techniques for depositing particles, with or without the use of a suspension including a fluid carrier, to achieve the results described above, so that the invention may be practiced otherwise than as specifically described and disclosed herein. Other materials besides brown alumina, to achieve the same purpose, may be utilized and, no doubt, would be considered by persons reasonably skilled in the art. Modifications may, therefore, be made to the specific embodiments and methods disclosed herein without departing from the scope of this invention and are intended to be included within the claims appended below.

What is claimed is:

1. An apparatus in which two spaced-apart light transmitting normally parallel layers of transparent materials are positioned to be held very close to each other locally, with substantial avoidance in the the generation of Newton rings thereby, comprising:
   a first layer, of a first transparent material, comprising a first surface and a parallel second surface, whereof said first surface received incident light and transmits a first portion of said light through said first layer and out through said second surface;
   a second layer, of a second transparent material, comprising a third surface and a parallel fourth surface, whereof said third surface is located adjacent to and parallel to said second surface of said first layer such as to receive light transmitted therethrough, said second layer transmitting through said fourth surface a second portion of said light received at said third surface; and
   fine particles, randomly sized within a predetermined size range, adhered to one of said second surface and said third surface such that the larger of said particles are randomly distributed in a predetermined density and in simultaneous contact with said second surface and said third surface.

2. An apparatus according to claim 1, wherein: said fine particles comprise glass beads.

3. An apparatus according to claim 1, wherein: said fine particles initially are deposited and adhere to said second surface of said first layer prior to placement of said first and second layers in said closely spaced apart juxtaposition.

4. An apparatus according to claim 1, wherein: said fine particles initially are deposited and adhere onto said third surface of said second layer prior to placement of said first and second layers in said closely spaced apart juxtaposition.

5. An apparatus according to claim 1, wherein: said predetermined size range is 3–100 microns.

6. An apparatus according to claim 1, wherein: said fine particles are chemically inert.

7. An apparatus according to claim 1, wherein: said fine particles are electrically non-conducting.

8. An apparatus according to claim 1, wherein: said fine particles have a tendency to adhere to a surface onto which they are sprayed in suspension with a fluid material.

9. An apparatus according to claim 1, wherein: said fine particles are randomly distributed in a density in the range 300–3,000 particles per square inch.

10. An apparatus according to claim 1, wherein: said fine particles comprise brown alumina.

11. An apparatus according to claim 1, wherein: said second layer is substantially stiffer than said first layer.

12. An apparatus according to claim 1, wherein: said first transparent material is Mylar (TM).

13. An apparatus according to claim 1, wherein: said second transparent material is an acrylic plastic.

14. A method for inhibiting the formation of Newton rings between adjacent surfaces of two transparent normally parallel and closely spaced apart layers, comprising the steps of: depositing on a first one of said adjacent surfaces fine particles, for adherence thereat, randomly sized within a predetermined size range and randomly distributed in a predetermined area density, said depositing step comprising spraying a suspension of said fine particles in a fluid carrier material onto said first surface and drying of the fluid carrier from the sprayed suspension to leave the fine particles adhered to the sprayed surface.

15. A method according to claim 14, wherein: said depositing step comprises spraying a suspension of said fine particles in a fluid carrier material onto said second surface.

16. A method according to claim 14, wherein: said depositing step comprises spraying onto said first surface a suspension of brown alumina particles in water.

17. A method according to claim 14, wherein: said depositing step comprises spraying onto said first surface a suspension of glass beads in an aqueous solution of a chloride salt of an alkaline earth metal.

18. A method according to claim 14, wherein: said fine particles are within the size range of 10–100 microns.

19. A method according to claim 14, wherein: said fine particles are randomly distributed within an area density in the range 300–3,000 particles per square inch.

* * * * *